United States Patent Office 3,100,156  
Patented Aug. 6, 1963

3,100,156  
THERMAL INSULATING PRODUCT AND METHOD FOR MAKING SAME  
George L. Kalousek, Newark, Ohio, and Arthur D. Denny, Erlton, N.J., assignors to Owens-Corning Fiberglas Corporation, Toledo, Ohio, a corporation of Delaware  
No Drawing. Filed Nov. 3, 1959, Ser. No. 850,543  
9 Claims. (Cl. 106—120)

This invention relates to a new and improved thermal insulating material and to the new and improved method for making the same.

Calcium silicate thermal insulating products are well known in the art, for example, as disclosed in United States Patents Nos. 2,469,379; 2,534,303; 2,547,127; 2,665,996; and in Reissue 23,228. Such products contain crystalline synthetic tobermorite and/or xonotlite, and are prepared by the induration of aqueous lime-silica slurries in which the molar ratio of lime-silica will fall within the range of from 0.65:1 to 1:1, and the water to solids ratio will vary from about 0.75:1 to about 9.0:1. In the preparation of preferred, low-density, insulating material, i.e., at densities ranging from about 5 to 25 pounds per cubic foot, asbestos fibers (preferably chrysotile or amosite or mixtures thereof) are added as a suspension medium and a reinforcing material.

The light apparent density of these products is achieved by first preparing stable suspensions having high water/solids ratios, casting these suspensions to shape and size, reacting the lime and silica to create a lattice-like structure of solids, then driving out the water from the interstices of this framework by drying. The apparent density of the product is controlled by the amount of water employed in the original slurry. The reaction may occur in a closed autoclave at superatmospheric pressures (from about 50 to 225 p.s.i.) and heat (preferably in excess of 173° C.) for a period of 2 to 15 hours. After removal from the molds, the finished products are dried to remove the contained water therefrom.

Such thermal insulating materials are useful in the formation of insulating blocks, molded pipe coverings, corematerial (for structural building units such as doors, walls, etc.), and the like, which must be capable of withstanding high temperatures. One disadvantage that exists in present processes for forming the finished products is that the aqueous lime-silica slurry is relatively thick and stiff, and when poured into a mold, traps air there to form air holes. Thus when the molded slurry is indurated, a product having air holes or pockets of varying sizes therein is formed. The second disadvantage is that because of the thickness and stiffness of the aqueous lime-silica slurry, it is extremely difficult to pour and "pouring folds" are formed in the mold, since the slurry is too thick to settle and completely fill the mold. Thus when the molded slurry is indurated and then removed from the mold, these "folds" are apparent on the exterior surface of the product and are evident as imperfections in the finished ware. While air holes and "folds" may be eliminated by careful and time-consuming pouring of the aqueous slurry in the molds, this merely adds to the cost of the finished product. The addition of additives to the slurry has resulted in excess foaming of the slurry and/or discoloration of the finished ware.

It is an object of this invention to eliminate the aforementioned disadvantages inherent in the formation of molded thermal insulating products.

It is a further object of this invention to improve the known methods of making a thermal insulating product from an aqueous lime-silica slurry which is normally too thick and stiff to satisfactorily pour into molds.

It is another object of this invention to provide an easily flowable thermal insulating aqueous lime-silica slurry which can be readily poured into molds of desired shape and size without the formation of air holes and "pouring folds" in the resulting product after induration.

In attaining the objects of this invention, one feature resides in adding to the known aqueous lime-silica thermal insulating slurry composition a minor amount of an anionic dispersing agent, sufficient to reduce the consistency of the thick, stiff slurry and render it easily flowable and pourable without creating any excessive foaming of the slurry and without discoloring the finished, indurated product.

Other objects, features, and advantages of the invention will be readily apparent from the following disclosure.

It has now be discovered that if to the known thermal insulating aqueous slurry of tobermorite $$(4CaO \cdot 5SiO_2 \cdot 5H_2O)$$

or xonotlite ($5CaO \cdot 5SiO_2 \cdot H_2O$), with or without asbestos fibers therein, such as chrysotile or amosite or mixtures thereof, is added from 0.0075 to 0.075% by dry weight of the solids in the slurry of a sodium salt of carboxylated polyelectrolite, as an anionic dispersant, the consistency of the usually thick and stiff slurry is considerably reduced so that the slurry is more easily poured into the molds with the consequent elimination of all air holes and without formation of the "pouring folds" in the finished, indurated product which has been common heretofore. An example of such an anionic dispersant is a sodium salt of an approximately 50:50 mole ratio copolymer of maleic anhydride with diisobutylene.

This composition has the following physical properties:

| | |
|---|---|
| Percent solids | 25±1%. |
| Specific gravity | 1.104. |
| Appearance | Light yellow liquid. |
| Gardner color | 3 maximum. |
| Viscosity | B–I+. |
| Freezing point (approximate) | −2° C. |
| pH of 10% aqueous solution | 9.5–10.5. |

The above compound has excellent stability towards heat and is particularly effective in the pH range of 9.0 to 9.5 and is supplied as a 25% aqueous solution. Thus from 0.03 to 0.3% of the 25% aqueous solution, based on the dry weight of the solids of the slurry is effective for the purposes of this invention although best results have been achieved with the addition of 0.1% and 0.2% of the 25% solution.

The following example is to be considered merely illustrative of the invention and is in no way limiting as to the scope thereof.

EXAMPLE 1

An aqueous lime-silica thermal insulating slurry containing the following ingredients was prepared.

| Raw materials: | Weight, pounds |
|---|---|
| Asbestos | 500 |
| Quicklime | 880 |
| Silica | 350 |
| Diatomite | 850 |
| Clay | 100 |
| Wollastonite | 100 |
| Water | 16,440 |

The resulting stiff, thick slurry was poured into a pipe-covering mold and indurated in a closed autoclave at a pressure of 225 p.s.i. and a temperature of 178° C. for 6½ hours. An examination of the formed product after drying revealed that it had a number of air holes therein and that "pouring folds" were evident as imperfections along the exterior surfaces of the molded pipe covering.

To a slurry made with the above ingredients was added 0.1% by weight of the dry solids, a 25% aqueous solution of a sodium salt of an approximately 50:50 mole ratio copolymer of maleic anhydride with diisobutylene. After thoroughly mixing this anionic dispersant with the slurry, the consistency of the slurry was appreciably reduced and the slurry was easier to pour into a mold for a pipe covering. After indurating the molded slurry, as described above, to form the finished, shaped product, and the subsequent drying thereof, an examination of the product showed that there were no air holes present therein and neither were any "pouring folds" evident.

It is surprising to find that such a small amount of the dispersing agent is sufficient to make such a dramatic change in the consistency of the slurry and in the resulting improved thermal insulating product.

The presence of the dispersing agent did not cause the slurry to foam, as occurs with many additives, nor did it cause any discoloration of the finished product.

Five series of tests were run with slurry samples for the tests taken from different plant batches. Three samples of equal weight were taken for each series of tests. One of these examples was used as a control, and the other two were treated with 0.1% and 0.2% by weight of the dry solids of an approximately 50:50 mole ratio copolymer of maleic anhydride with diisobutylene. The weighed amount of this anionic dispersant was added to the correspondingly weighed slurry in a 5-gallon bucket and stirred with a mechanical agitator for five minutes. The consistency of the mixtures was then measured and the results are set forth in Table I.

*Table I*

| Percent anionic dispersant added | Series A | Series B | Series C | Series D | Series E |
|---|---|---|---|---|---|
| 0 (control) | 230 | 202 | 200 | 197 | 220 |
| 0.1 | 175 | 152 | 158 | 160 | 190 |
| 0.2 | 147 | 142 | 140 | 137 | 175 |

Thus from the above it is apparent that as little as 0.1% to 0.2% of the anionic dispersant (actually 0.025% and 0.05% of the sodium salt of an approximately 50:50 mole ratio copolymer of maleic anhydride with diisobutylene, per se) gives greatly reduced consistency values for the slurry, making it more easily pourable into molds, thus eliminating the formation of air holes and "pouring folds" in the finished calcium silicate thermal insulating product.

Having described the invention, what is claimed is:

1. In the process for forming a molded thermal insulating product comprising preparing an aqueous lime-silica slurry having a lime to silica molar ratio within the range of from 0.6 to 1:1 and a water to solids ratio from 0.75:1 to 9:1, pouring said slurry into a mold, and indurating the slurry to form a molded crystalline hydrous calcium silicate product, the improvement whereby the consistency of said slurry is reduced from a thick, stiff slurry to one which is easily pourable into a mold and the product formed therefrom is free of air holes and pouring folds, consisting of adding to said aqueous lime-silica slurry from 0.0075 to 0.075% by dry weight of the solids in said slurry of a sodium salt of an approximately 50:50 mole ratio copolymer of maleic anhydride with diisobutylene.

2. The improvement in the process as defined in claim 1 wherein said sodium salt is present in an amount of 0.025% by weight of dry solids in said aqueous lime-silica slurry.

3. The improvement in the process as defined in claim 1 wherein said sodium salt is present in an amount of 0.05% by weight of dry solids in said aqueous lime-silica slurry.

4. In the process for forming a molded thermal insulating product comprising preparing an aqueous lime-silica slurry having a lime to silica molar ratio within the range of from 0.6 to 1:1 and a water to solids ratio of from 0.75:1 to 9:1, pouring said slurry into a mold, and indurating the slurry to form a molded crystalline hydrous calcium silicate product, the improvement whereby the consistency of said slurry is reduced from a thick, stiff slurry to one which is easily pourable into a mold and the product formed therefrom is free of air holes and pouring folds, consisting of adding to said aqueous lime-silica slurry from 0.03 to 0.3% by dry weight of the solids in said slurry of a 25% aqueous solution of a sodium salt of an approximately 50:50 mole ratio copolymer of maleic anhydride with diisobutylene having the following physical properties:

Specific gravity _____ 1.104.
Appearance _____ Light yellow liquid.
Gardner color _____ 3 maximum.
Viscosity _____ B–I+.
Freezing point (approximate) _____ −2° C.
pH of 10% aqueous solution _____ 9.5 to 10.5.

5. An aqueous lime-silica slurry for forming, after molding and induration, a thermal insulating calcium silicate product free from air holes and pouring folds consisting essentially of a lime-silica slurry having a lime to silica molar ratio within the range of 0.6 to 1:1 and a water to solids ratio of from 0.75:1 to 9:1, and from 0.0075 to 0.075% by dry weight of the solids in said slurry of a sodium salt of an approximately 50:50 mole ratio copolymer of maleic anhydride with diisobutylene.

6. The aqueous lime-silica slurry as defined in claim 5 wherein said sodium salt is present in an amount of 0.025% by dry weight of solids in said slurry.

7. The aqueous lime-silica slurry as defined in claim 5 wherein said sodium salt is present in an amount of 0.05% by dry weight of solids in said slurry.

8. An aqueous lime-silica slurry for forming, after molding and induration, a thermal insulating calcium silicate product free from air holes and pouring folds consisting essentially of a lime-silica slurry having a lime to silica molar ratio within the range of 0.6 to 1:1 and a water to solids ratio of from 0.75:1 to 9:1, and from 0.03 to 0.3% by dry weight of the solids in said slurry of a 25% aqueous solution of a sodium salt of an approximately 50:50 mole ratio copolymer of maleic anhydride with diisobutylene having the following physical properties:

Specific gravity _____ 1.104.
Appearance _____ Light yellow liquid.
Gardner color _____ 3 maximum.
Viscosity _____ B–I+.
Freezing point (approximate) _____ −2° C.
pH of 10% aqueous solution _____ 9.5 to 10.5.

9. A molded thermal insulating product free of air holes and pouring folds comprising crystalline hydrous calcium silicate made by indurating an aqueous lime-silica slurry having a lime to silica molar ratio within the range of from 0.6 to 1:1 and a water to solids ratio of from 0.75:1 to 9:1, and containing from 0.0075 to 0.075% by dry weight of the solids in said slurry of a sodium salt of an approximately 50:50 mole ratio copolymer of maleic anhydride with diisobutylene.

References Cited in the file of this patent

UNITED STATES PATENTS

| Re. 23,228 | Fraser | May 9, 1950 |
| 2,469,379 | Fraser | May 10, 1949 |
| 2,534,303 | Serinis | Dec. 19, 1950 |
| 2,547,127 | Kalousek | Apr. 3, 1951 |
| 2,665,996 | Kalousek | Jan. 12, 1954 |
| 2,888,377 | Allen | May 26, 1959 |

FOREIGN PATENTS

| 1,037,420 | Germany | Aug. 28, 1958 |